United States Patent
Furukawa

[11] Patent Number: 5,995,468
[45] Date of Patent: Nov. 30, 1999

[54] DISC DRIVE

[76] Inventor: Ken'ichi Furukawa, c/o Mitsumi Electric Co., Ltd. of 8-8-2, Kokuryo-cho, Chofu-shi, Tokyo, Japan

[21] Appl. No.: 08/896,687

[22] Filed: Jul. 18, 1997

[30] Foreign Application Priority Data

Jul. 18, 1996 [JP] Japan ..................... 8-207920

[51] Int. Cl.⁶ ............ G11B 33/02; G11B 17/04
[52] U.S. Cl. ................... 369/77.1; 360/99.08
[58] Field of Search ............... 369/77.1, 77.2, 369/247, 263

[56] References Cited

U.S. PATENT DOCUMENTS

| | | | |
|---|---|---|---|
| 4,922,478 | 5/1990 | Verhagen | 369/247 |
| 5,123,005 | 6/1992 | Kurosu | 369/77.1 |
| 5,128,918 | 7/1992 | Suzuki et al. | 369/77.1 |
| 5,204,850 | 4/1993 | Obata | 369/75.2 |
| 5,349,486 | 9/1994 | Sugimoto et al. | 360/97.01 |
| 5,625,612 | 4/1997 | Tozune et al. | 369/77.2 |
| 5,737,304 | 4/1998 | Soga et al. | 369/247 |
| 5,768,249 | 6/1998 | Ro et al. | 369/263 |

FOREIGN PATENT DOCUMENTS

| | | |
|---|---|---|
| 0 416 797 A2 | 3/1991 | European Pat. Off. |
| 0 478 198 A1 | 4/1992 | European Pat. Off. |
| 0 539 199 A2 | 4/1993 | European Pat. Off. |
| 0 583 946 A1 | 2/1994 | European Pat. Off. |
| 0 665 544 A2 | 8/1995 | European Pat. Off. |

*Primary Examiner*—David L. Ometz
*Assistant Examiner*—Angel Castro
*Attorney, Agent, or Firm*—Brian M. Matton; Patents & TMS, P.C.

[57] ABSTRACT

A disc drive includes a drive mechanism 60 having an operative gear 65 rotated by a motor. The operative gear 65 carries out a first operation which moves a disc tray between a disc loading position and a disc eject position with a cam mechanism being held at the first position, when the operative gear is engaged with a first rack of the disc tray, and the operative gear carries out a second operation which displaces the cam mechanism between the first position and the second position when the operative gear is engaged with the second rack, thereby displacing a mechanism unit 42 provided with a turntable between a raised position and a lowered position. By constructing in this way, it is possible to provide a disc drive which has a simple structure formed form a small number of parts and which can be assembled with fewer steps. The mechanism unit is formed from a base frame 43 and a support member 44 which is supported on the base frame through three elastic members arranged at predetermined positions, thereby enabling to prevent vibrations generated by the rotation of the disc from being transmitted to the base frame, the chassis and the casing.

9 Claims, 8 Drawing Sheets

DISC DRIVE

BACKGROUND OF THE INVENTION

1. Field of the Invention

The present invention relates to a disc drive for playing back or recording and playing back a disc such as an optical disc or the like.

2. Description of the Prior Art

One example of a disc drive for playing back an optical disc such as a CD-ROM or the like is disclosed in an application (Japanese Utility Model Application No. HEI-5-69414). FIG. 1 is an exploded perspective view which shows the structure of the disc drive of this application.

As shown in this drawing, a disc drive 1B is constructed from a main body 2, a disc tray 5 which moves backwards and forwards with respect to the main body 2 to enable the disc tray 5 to be insertable into and ejectable out of the main body 2, a circuit substrate assembly 12 arranged below the main body 2, and a casing 10 which houses all these elements.

The casing 10 is constructed from a bottom plate 11 and a case 14 which covers the top of the main body 2. The bottom plate 11 and the case 14 are made from metal plates which have undergone a bending process to form a desired shape.

The case 14 is constructed from a top plate 14a, side walls 14b, 14c which face each other through the main body 2, a rear wall 14d which connects the rear edges of the side walls 14b, 14c, and a front plate portion 14e at the front thereof.

Formed in the front plate 14e of the case 14 is an aperture 141 to allow the disc tray 5 to be passed therethrough. A front panel 13 having an aperture 13a corresponding to the aperture 141 is mounted to the front plate 14e via a cushioning member frame 15.

The main body 2 includes a roughly container-shaped chassis 20 which is provided with a mechanism unit 22 and a displacement mechanism (ascending/descending mechanism) 30. The mechanism unit 22 is arranged within a concave portion formed in the bottom portion 20a of the chassis 20. Further, the main body 2 is fixed to the bottom plate 11 and the case 14 by means of screws 17.

The mechanism unit 22 includes a base 23 which is provided with a spindle motor 25 for rotating a turntable, a turntable 26 which is fixed to a rotation axis of the spindle motor 25, an optical head (optical pick-up) 27, and an optical head moving mechanism 28. Further, a rear end portion (toward the back of the main body 2) of the base 23 is supported by an insulator 29 to enable the base 23 to be freely pivotal with respect to the chassis 20.

The displacement mechanism 30 is constructed from a motor 31 provided at a front portion of the chassis 20, a rotational speed reduction mechanism 32 for reducing the rotational speed of the motor 31, a cam wheel (ascending/descending gear) 33 which is rotated via the rotational speed reduction mechanism 32, and a base ascending/descending member (not shown in the drawing) which is displaced (pivoted) in accordance with the rotation of the cam wheel 33.

The cam wheel 33 includes a lower gear 33a which meshes with a pinion gear of the rotational speed reduction mechanism 32, and an upper gear 33b which meshes with a rack gear (not shown in the drawing) formed on the rear surface of the disc tray 5 in the forward and backward direction thereof. Further, a circumferential cam groove is formed in the outer circumference of the axle portion between the gears 33a, 33b. This cam groove receives a protruding follower (not shown in the drawing) formed on the base ascending/descending member. Consequently, as the cam wheel is rotated, the follower and the base ascending/descending member are displaced, and this causes the base 23 to pivot; namely, the front portion of the base 23 is pivotally moved up or down between a raised position and a lower position.

Further, a disc clamp 38 is provided on a top plate 14a of the casing 10 in a manner that enables the disc clamp 38 to rotate with respect to the top plate 14. Further, the disc clamp 38 is adapted to attach to the permanent magnet provided in the turntable 26 by the attracting force thereof, whereby the optical disc 3 can be held between the turntable 26 and the disc clamp 38.

The disc tray 5 includes a shallow concave disc supporting portion 5a for supporting an optical disc 3, and the rack gear is formed on the rear surface thereof (not shown in the drawing) which meshes with the upper gear 33b of the cam wheel 33. Consequently, as the cam wheel 33 is rotated, the disk tray 5 is moved forward or backward with respect to the chassis 20 between a disc unloading position (eject position) and a disc loaded position (playback position).

When the disc drive 1B is not in use, the disc tray 5 is housed within the casing 10 (at the disk loaded position/playback position). In this state, if an eject operation is carried out, the motor 31 is rotated in a prescribed direction, whereby the cam wheel 33 is rotated in a counterclockwise direction via the rotational speed reduction mechanism 32. This rotation of the cam wheel 33 causes the disc tray 5 to move forward and protrude to a position (the disc unloading position) outside the casing 10 through the apertures 141, 16a.

In this state, a disc 3 is loaded into the disc loading portion 5a of the disc tray 5, and a loading operation is carried out, whereby the motor 31 is rotated in the opposite direction, and this causes the cam wheel 33 to rotate in the opposite direction via the rotational speed reduction mechanism 32. Consequently, the disc tray 5 is moved toward the back of the disc drive, through the apertures 141, 13a, to the disc loaded position. In this way, the loaded optical disc 3 which is placed at a prescribed position on the disc tray 5 is also transported to the disc loaded position of the main body 2.

Further, when the cam wheel 33 begins to rotate in the opposite direction, the follower of the base ascending/descending member moves along the cam groove, and the center of the disc 3 approaches the central portion of the turntable 26, at which time the follower and the base ascending/descending member are displaced, and the front portion of the base 23 pivots about the position of the insulator 29 to go from a lower position to a supported higher position, whereby the base 23 is placed in a roughly horizontal state.

In this way, the center portion (center hub portion) of the turntable 26 is fitted into a center hole 3a of the optical disc 3, and as the center portion of the optical disc is supported in this way, the disc clamp 38 is magnetically stuck to the turntable 26, with the optical disc 3 being held between the turntable 26 and the disc clamp 38. In this state, the spindle motor 25 is operated to rotate the optical disc 3 at a predetermined rotational speed, and then the information recorded on the optical disc 3 is played back using the optical pick-up 27.

If an eject operation is carried out while the rotation of the optical disc 3 is stopped, the operations of each mechanism of the disc drive 1B described above are carried out in reverse order and direction, thereby the disc clamp 38 being released and thereby the optical disc 3 supported on the disc tray 5 being ejected.

In the disc drive 1B having the construction described above, it is possible to smoothly move the disc tray 5 and raise and lower the mechanism unit 22, and it is also possible to reliably and accurately carry out all the basic required operations, such as disc loading, disc recording/playback and disc ejection.

However, in recent years, it has become necessary to reduce the cost of this type of disc drive in order to lower the overall cost of the computer itself. As a result, there is a need for a disc drive having a simpler construction made from fewer parts which can be assembled in fewer steps, but this is very difficult to achieve with the prior art disc drive described above due to the use of the relatively complex construction of the cam wheel, base ascending/descending member and the like.

Further, in recent years, disc drives have been developed to rotate a disc at high speeds, such 8 times speed, 12 times speed and the like, however this has created problems. Namely, when a disc is rotated at such a high speed, the dimensional error and the deviation of the center of mass of the disc will create an eccentric rotation which can generate vibration. If thus generated vibration is transmitted to the chassis and the casing, such transmitted vibration can cause noise to be emitted from the disc drive. Accordingly, in disc drives which rotate a disc at high speed, there is a need to prevent the transmission of vibrations generated by the rotation of the disc.

SUMMARY OF THE INVENTION

In view of the problems described above, it is a main object of the present invention to provide a disc drive having a simple construction of few parts which require few assembling steps.

It is a another object of the present invention to provide a disc drive having a simple construction which makes it possible to prevent the transmission of vibrations generated due to high speed rotation of a disc.

In order to achieve the main object, a disc drive according to the present invention comprises:

a main body having a chassis;

a mechanism unit having a turntable on which a disc is to be placed and a pick-up for playing back or playing back and recording the disc, the mechanism unit having a front portion and a rear portion, and the rear portion of the mechanism unit is pivotally supported on the chassis such that the front portion is displaceable between a raised position in which the disc is supported on the turntable and a lowered position which is lower than the raised position;

a cam mechanism provided forward the mechanism unit so as to be cooperatively associated with the mechanism unit, the cam mechanism adapted to be displaceable between a first position in which the mechanism unit is in the lowered position and and a second position in which the mechanism unit is in the raised position;

a disc tray which is movable with respect to the main body between a disc loading position and a disc eject position, the disc tray having a first rack and a second rack which is continuous to the first rack; and a drive mechanism having an operative gear which is engaged with the racks of the disc tray, the drive mechanism carries out a first operation which moves the disc tray between the disc loading position and the disc eject position with the cam mechanism being held at the first position, when the operative gear is engaged with the first rack, and a second operation which displaces the cam mechanism between the first position and the second position when the operative gear is engaged with the second rack.

According to the disc drive of the present invention described above, the operative gear of the drive mechanism acts not only as a driving gear for driving the disc tray but also as a driving gear for driving the cam member which displaces the mechanism unit between the raised position and the lowered position, and such an operative gear having the functions is accommodated within a limited space in the chassis provided in front of the mechanism unit. Therefore, it is possible to simplify the structure of the disc drive in comparison with the prior art disc drive. Further, by employing such a part as the planetary arm which supports the operative gear rotatably and acts to move the cam member, the number of the parts required can be reduced and the assembly thereof can be made easy.

In the present invention, it is preferred that the second operation is carried out when the disc tray is moved to the disc loading position and further movement thereof is restricted.

Further, it is also preferred that the first rack is formed into a linear shape which extends along the direction of the movement of the disc tray, and the second rack is formed into an arc-shaped continuous to the linear first rack, the operative gear being held at a prescribed position during the first operation and acting as a driving gear which is in engagement with the first rack for moving the disc tray, and, during the second operation acting, as a planetary gear which is in engagement with the second rack for displacing the cam mechanism between the first and second positions.

Furthermore, it is also preferred that the drive mechanism includes a motor, rotational speed reduction mechanism comprising a plurality of gears for transmitting the rotation of the motor with reducing its speed, the plurality of the gears include a gear which acts as a sun gear having a rotation axis, a planetary arm which is rotatably supported on the rotation axis of the sun gear, wherein the operative gear is in mesh with the sun gear and rotatably supported by the planetary arm.

Moreover, it is also preferred that the planetary arm has a central portion which is mounted to the rotation axis of the sun gear of the rotational speed reduction mechanism, a first arm extending from the central portion and a second arm extending from the central portion, in which the first arm is provided with a rotation axis for the operative gear and the second arm is coupled with the cam mechanism.

Moreover, it is also preferred that the cam mechanism is provided adjacent to the front portion of the mechanism unit through a predetermined space therebetween so as to be displaceable in a direction orthogonal to the moving direction of the disc tray between the first and second positions.

Furthermore, it is also preferred that the cam mechanism includes slanting cam which guides a cam pin provided on the front portion of the mechanism unit in up and down direction.

Furthermore, it is also preferred that the cam mechanism is being held at the first position while the disc tray is moving from the disc eject position to the disc loading position.

Another aspect of the present invention is directed to a disc drive comprises:

a main body having a chassis;

a mechanism unit having a turntable on which a disc is to be placed and a pick-up for playing back or playing back and recording the disc, the mechanism unit having a front portion and a rear portion, and the rear portion of the mechanism unit is pivotally supported on the chassis such that the front portion is displaceable between a raised position in which the disc is supported on the turntable and a lowered position which is lower than the raised position;

a cam mechanism provided forward the mechanism unit so as to be cooperatively associated with the mechanism unit, the cam mechanism adapted to be displaceable between a first position in which the mechanism unit is in the lowered position and and a second position in which the mechanism unit is in the raised position;

a disc tray which is movable with respect to the main body between a disc loading position and a disc eject position, the disc tray having a rack; and a drive mechanism having an operative gear which is in engagement with the rack of the disc tray for moving the disc tray between the disc loading position and the disc eject position;

wherein the drive mechanism displaces the cam mechanism from the first position to the second position by means of the operative gear when the disc tray is moved to the disc loading position by the drive mechanism and further movement thereof is restricted.

The present invention is also directed to a disc drive which comprises:

a main body having a chassis;

a base frame having a front portion and a rear portion, the rear portion being pivotally supported on the chassis such that the front portion is displaceable between a raised position in which the disc is supported on the turntable and a lowered position which is lower than the raised position;

a support member which is supported on the base frame through elastic members, the support member being provided with a turntable on which a disc is to be placed and a pickup for playing back or playing back and recording the disc, a displacing mechanism provided forward the base frame, the displacing mechanism being operatively associated with the base frame so as to displace the base frame between the raised position and the lowered position; and a disc tray which is movable with respect to the main body between a disc loading position and a disc eject position;

wherein the support member is supported on the base frame through the elastic members at three-positions including right side, left side and rear side of the turntable.

According to this alternative, the mechanism unit is constructed from the base frame and the support member on which the turntable or the like are provided, and the support member is supported on the base frame by means of three elastic members which are arranged at the left and right sides of the turntable and at the back side of the turntable. BY such an arrangement of the elastic members, it is possible to effectively absorb vibrations generated by eccentric rotation of the optical disc, thereby enabling to prevent such vibrations from being transmitted to the base frame or the chassis. In particular, since the drive mechanism (loading mechanism) is accommodated in a limited space of the chassis in front of the mechanism unit, it is possible for the mechanism unit to have a sufficient width. As a result, it is possible to arrange the elastic members at the corners position of the base frame so as to have a sufficient distance therebetween at the right and left sides of the front of the turntable, and such an arrangement of the elastic members are particularly effective for absorbing the vibrations.

In this disc drive, it is preferred that the base frame is formed into a substantially rectangular shape and has rotation axles at the opposite sides of the rear portion thereof, respectively, and the support member is formed into a substantially rectangular shape so as to be accommodated within the base frame, and the support member is supported on the base frame through the elastic members at the three-positions including right and left corners of the front portion of the support member and a substantially middle point of the rear portion thereof.

Other objects, structures and advantages of the present invention will be apparent when the following description of the preferred embodiment is considered taken in conjunction with the accompanying drawings.

DETAILED DESCRIPTION OF THE PREFERRED EMBODIMENTS

A detailed description of the preferred embodiments of a disc drive according the present invention will now be given below with reference to the appended drawings. In this connection, it is to be noted that the same reference numbers will be used for the parts or components of the present invention that are the same or similar to the parts or components of the prior art disc drive described above.

Figure 2:
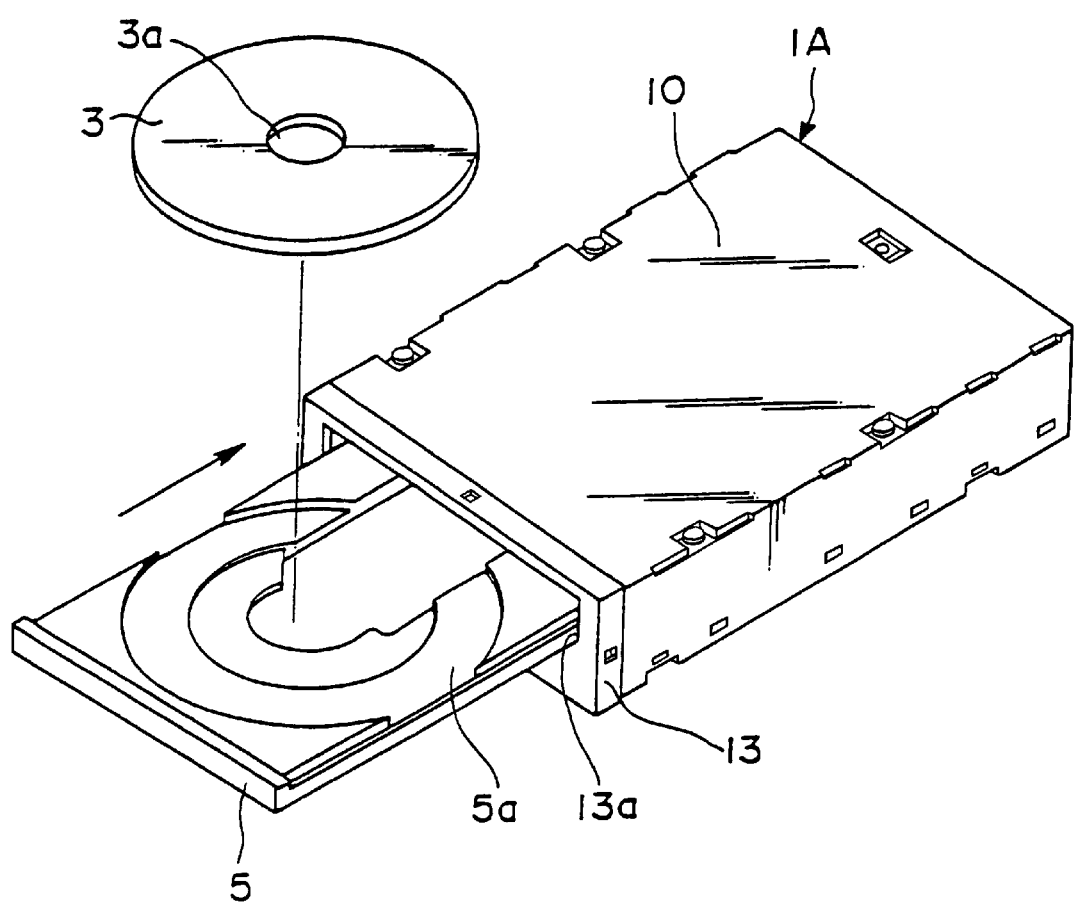
FIG. 2 is a perspective view of a disc drive of an embodiment according to the present invention.
Figure 3:
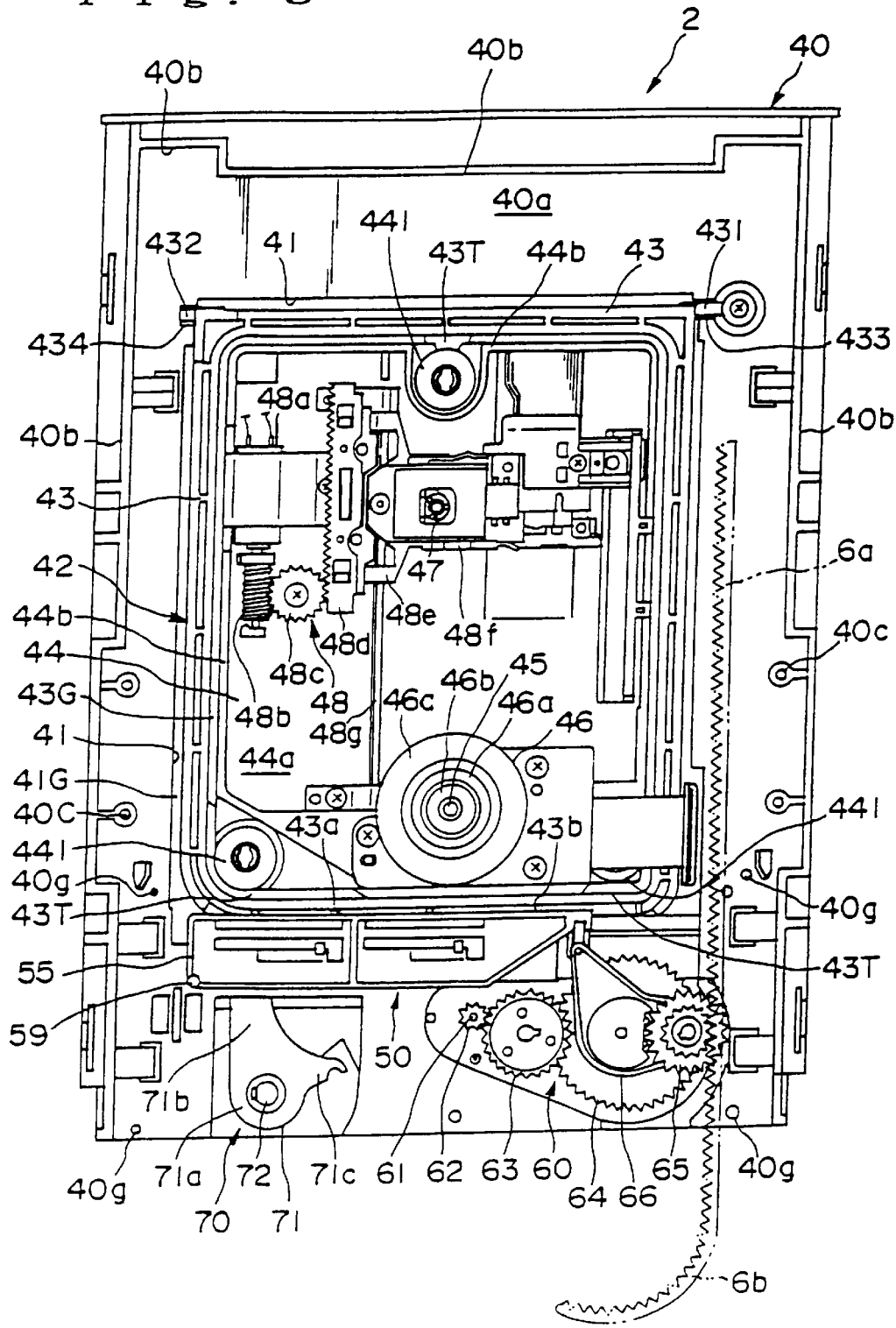
FIG. 3 is a planar view of a main body of the same embodiment, in which a mechanism unit is shown in a lowered position.
Figure 4:
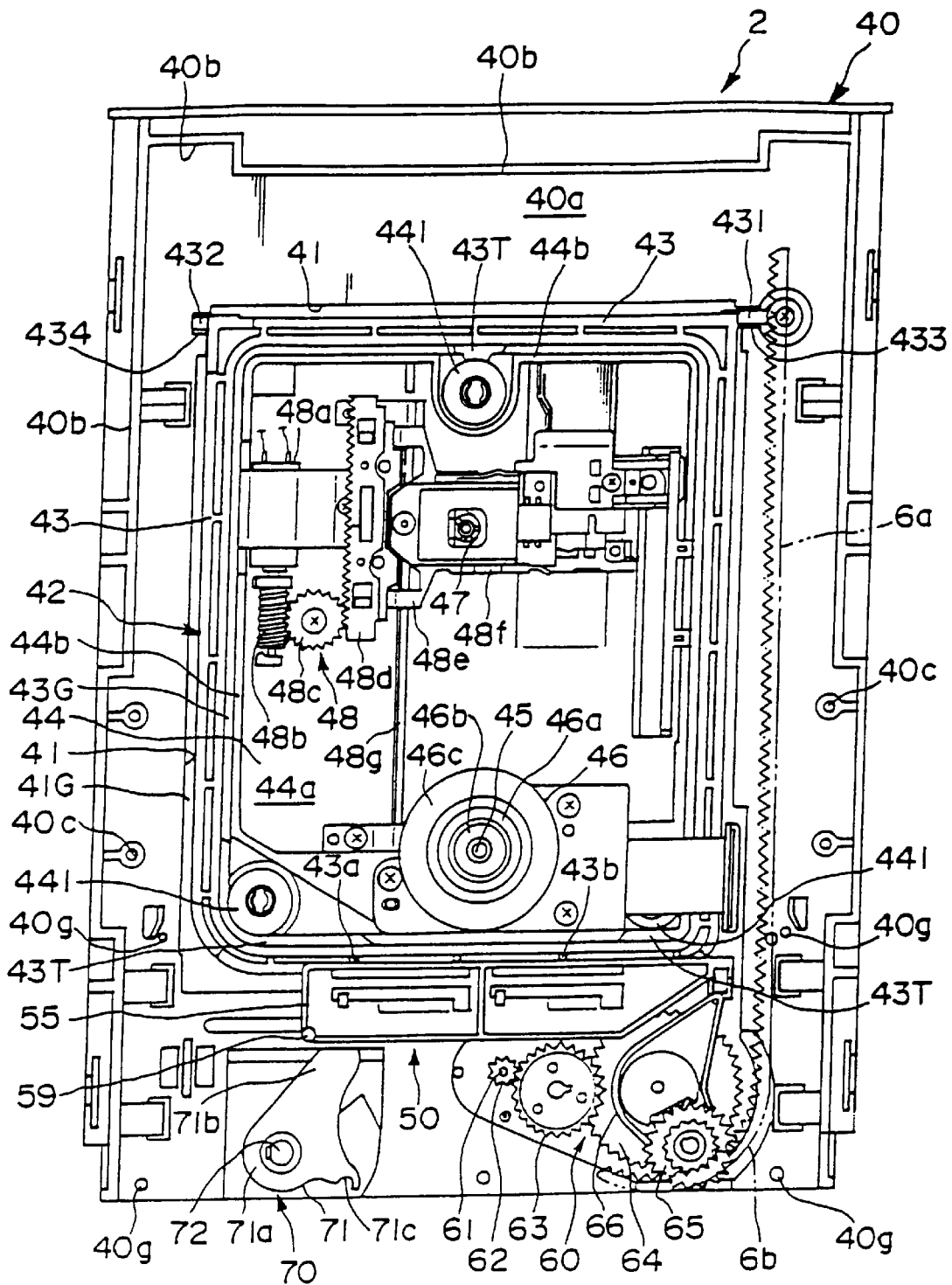
FIG. 4 is another planar view of the main body of the same embodiment, in which the mechanism unit is shown in a raised position.

FIG. 2 is a perspective view of an embodiment of a disc drive 1A according to the present invention, FIG. 3 is a planar view of a main body 2 of the same embodiment, which shows a state in which a mechanism unit 42 is shown in a lowered position (lower position), and FIG. 4 is another planar view of the main body 2 of the same embodiment, which shows a state in which the mechanism unit 42 is shown in a raised position (upper position).

Figure 1:
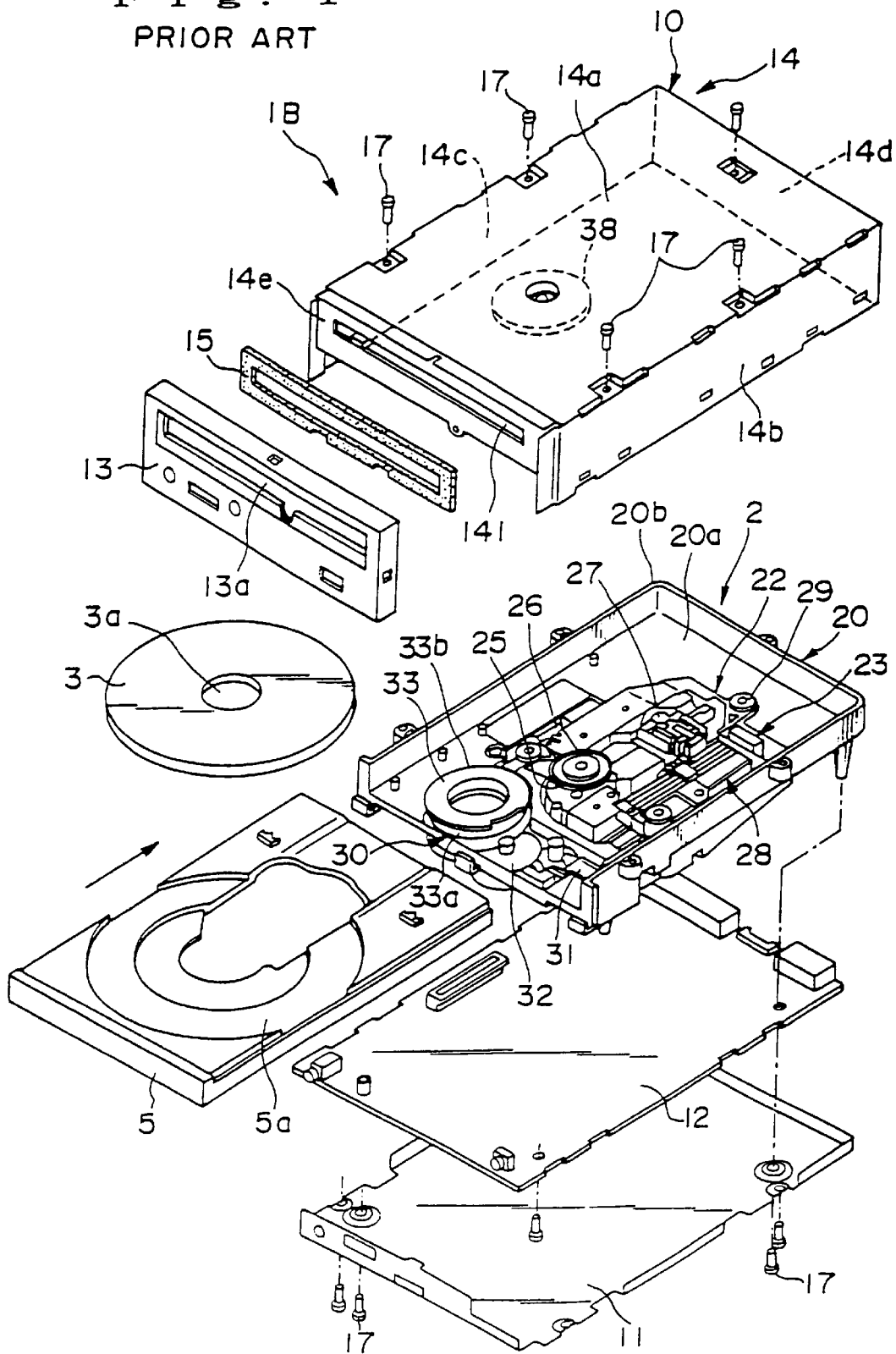
FIG. 1 is a perspective view of a prior art disc drive.

As shown in FIG. 2, the disc drive 1A of the present invention is a device for playing back or recording and playing back an optical disc 3, such as a CD-ROM or audio CD, in the same manner as the prior art device shown in FIG. 1. The disc drive 1A is roughly constructed from a casing 10 which houses the main body (mechanism assembly), a disc tray 5 which moves in the forward and backward direction (horizontal direction) with respect to the casing 10 in order to transport the optical disc 3, and a circuit substrate assembly (not shown in the drawings) provided in a bottom portion of the main body.

In the same manner as was described above for the prior art apparatus shown in FIG. 1, the casing 10 is constructed from a plurality of metal plates, with the front portion thereof being provided with a front panel having an aperture 13a.

As shown in FIGS. 2 and 3, the main body 2 which is housed inside the casing 10 is shaped roughly like a container and includes an chassis 40 which is preferably constructed from a hard resin. The chassis 40 is constructed from a roughly rectangular-shaped bottom portion and a U-shaped wall portion 40a which stands erect along the left, right and back edge portion of the bottom portion 40a.

In this way, no wall portion is formed in the front of the chassis 40 in order to allow the front of the chassis to be open. Further, when the main body 2 is assembled into the casing 10, the open front portion of the chassis 40 is aligned with the aperture 13a of the front panel 13 provided on the casing 10.

As shown in FIG. 2, the disc tray 5 is provided with a shallow concave disc supporting portion 5a into which the optical disc 3 is placed to enable the optical disc 3 to be transported to a prescribed disc loading position.

As shown in FIGS. 3 and 4, on the left and right portions of the bottom portion 40a of the chassis 40, there are provided with protruding guide members 40g (FIGS. 2, 3) which engage with guide grooves 5L, 5R formed in left and right side portions of the underside surface of the disc tray 5. Further, the underside surface of the disc tray 5 is further provided with a rack gear 6 which includes a first rack 6a which extends in a straight line in the forward and backward direction along the guide groove L and a roughly 90 degree arc-shaped second rack 6b which is formed at the front end portion (the front side of the disc tray 5, as shown in the lower portion of FIG. 5) of the first rack 6a so as to be continuous therewith.

Figure 5:
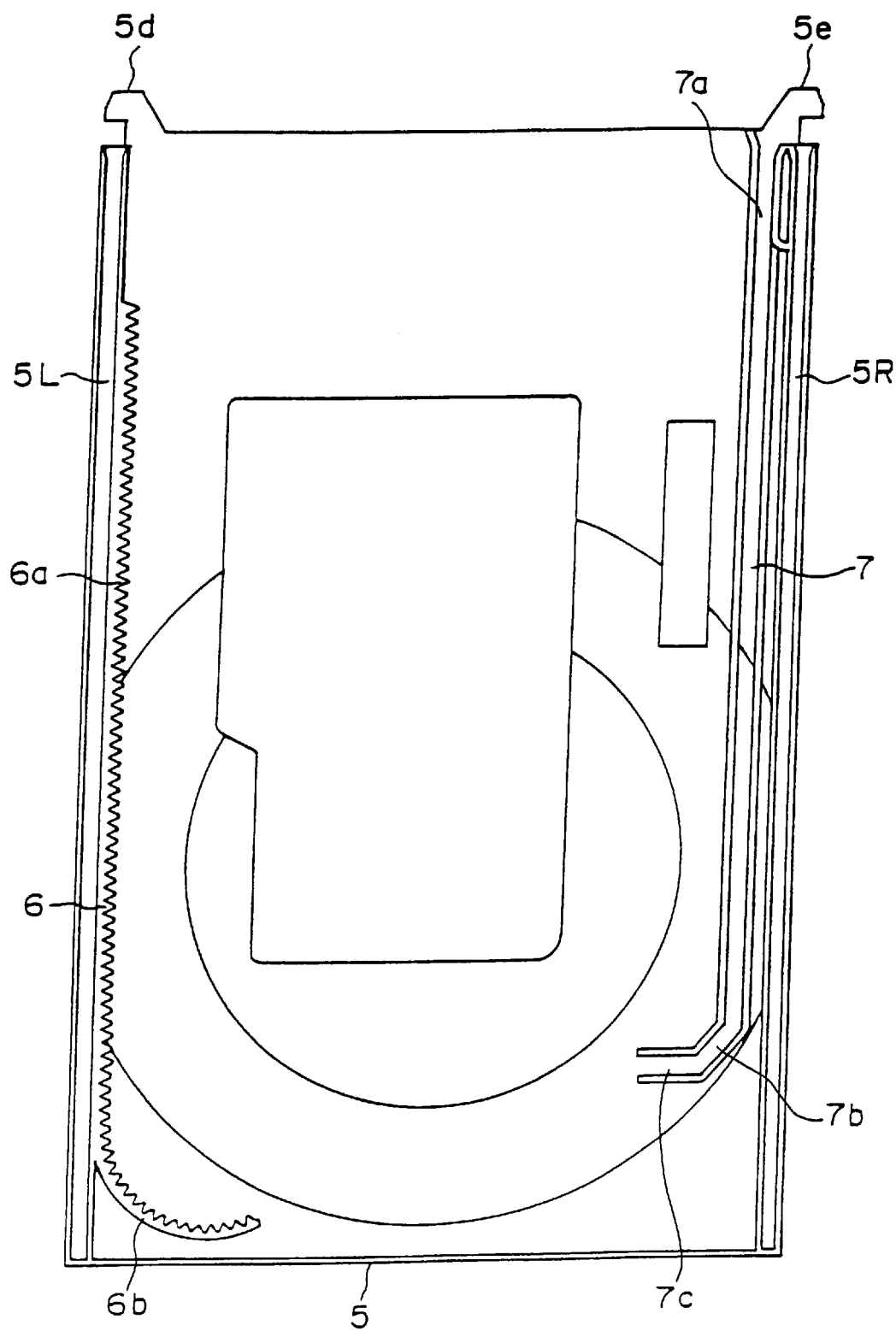
FIG. 5 is a bottom view of the construction of the underside of a disc tray of the disc drive shown in FIG. 2.

Further, as shown in FIG. 5, a cam member movement restricting groove 7 is provided on the underside surface of the disk tray 5 along the guide groove 5R which is positioned at the opposite side of the first rack 6a. This cam member movement restricting groove 7 is constructed from a first movement restricting groove 7a which extends parallel to the first rack 6a, a second movement restricting groove 7b which slants at a roughly 45 degree angle with respect to the first movement restricting groove 7a, and a third movement restricting groove 7c which slants at a roughly 45 degree angle with respect to the second movement restricting groove 7b. Accordingly, the third movement restricting groove 7c is arranged at a roughly 90 degree angle with respect to the first movement restricting groove.

Further, as shown in FIGS. 3 and 4, the chassis 40 is provided with a mechanism unit 42 equipped with a turntable 46 for rotating an optical disc 3, an optical head (optical pick-up) 47 for playing back or recording and playing back the optical disc 3. The mechanism unit 42 is arranged inside a roughly rectangular-shaped opening 41 formed in the bottom portion 40a of the chassis 40, with the rear portion of the mechanism unit 42 being supported in a manner that makes it possible for such rear portion to pivot with respect to the chassis 40 in order to enable the front portion of the mechanism unit 42 to be displaced between a raised position (upper position; FIG. 4) in which the optical disc 3 is supported on the turntable 46 and a lowered position (lower position) which is lower than the raised position.

In particular, as shown in FIGS. 3 and 4, the mechanism unit 42 includes a base frame 43 constructed preferably from hard resin, and a support member (support plate) 44 which supports the base frame 43 via an elastic member (insulator) 441.

The base frame 43 is formed so as to have a roughly rectangular shape which includes a front portion and a rear portion. Formed on the left and right side portions of the rear side of the base frame 43 (the back portion of the main body 2) are protruding axles 431, 432 which act as pivotal axles to enable the mechanism unit 42 to pivot with respect to the chassis 40. These axles 431, 432 are inserted into respective axle holes 433, 434 formed in the opposite inner sides of the chassis 40. By supporting the rear portion of the mechanism unit 42 with the axles 431, 432 in this way, the front portion of the mechanism unit 42 is able to pivot with respect to the chassis 40 between the lowered position shown in FIG. 3 and the raised position shown in FIG. 4.

Figure 6:
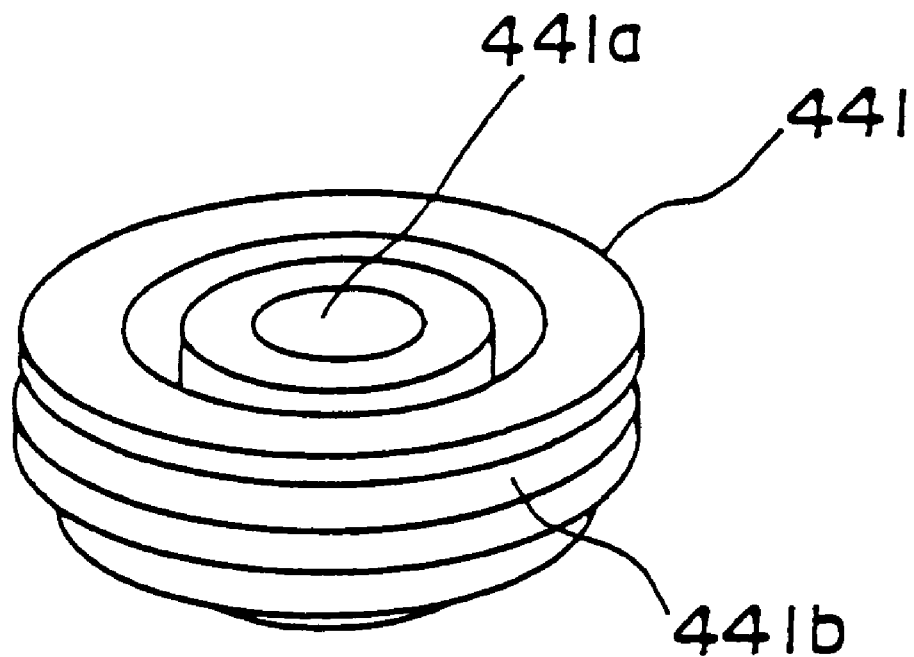
FIG. 6 is a perspective view showing the structure of elastic members used in the disc drive shown in FIG. 2.
Figure 7:
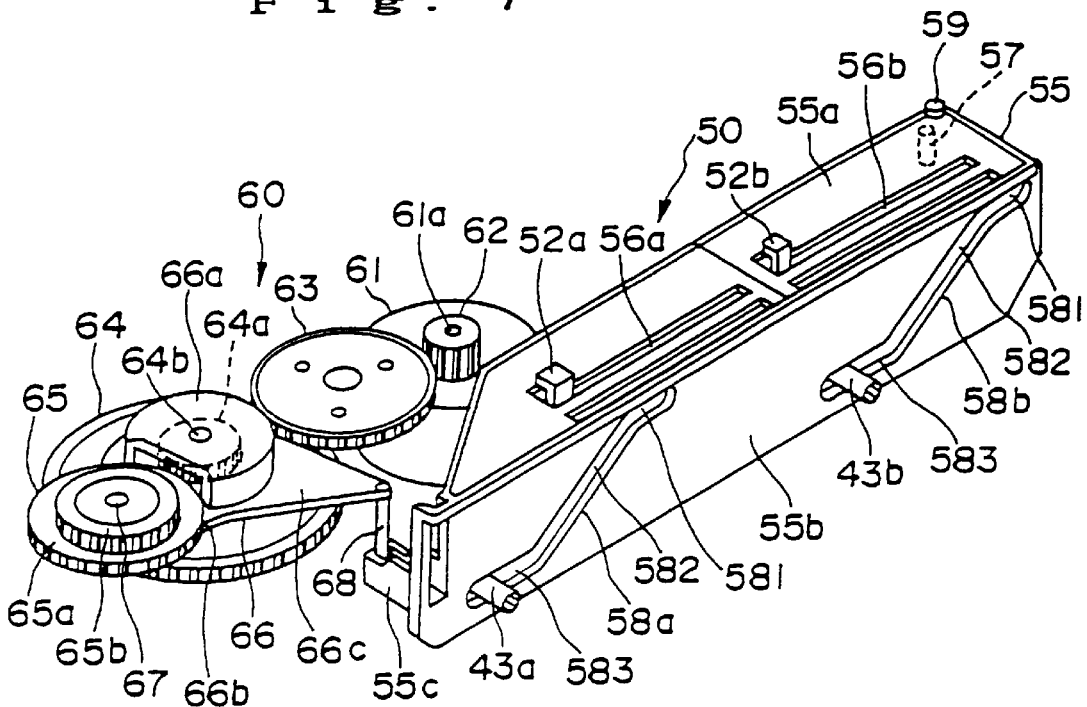
FIG. 7 is a perspective view showing the structure of a cam member used in the disc drive shown in FIG. 2, in which the cam member is shown in a first position.

Further, a pair of protruding guide pins 43a, 43b are formed on the front of the base frame 43 (See FIGS. 6 and 7). These guide pins 43a, 43b are engaged respectively with a pair of guide slots (not shown in the drawings) formed in the wall of the front portion of the chassis 30 which defines the opening 41 of the chassis 40, and this enables the front portion of the base frame 43 to be guided up or down.

Taking the possibility of deformation (thermal deformation or the like) of the chassis 40 into account, a spacing 41G is provided between the base frame 43 and the chassis 40 which defines the opening 41 Specifically, this spacing 41G is provided around roughly the entire circumference of the base frame 43, and in this way the pivotal movement of the base frame 43 is not hindered even when the chassis 40 undergoes maximum distortion.

The support member 44 is constructed from a roughly rectangular-shaped bottom portion 44a and a wall portion 44b formed around the circumference of the bottom portion 44a. The wall portion 44b is one size smaller than the base frame 43 such that the wall portion 44b is arranged inside the frame of the base frame 43 via a prescribed spacing 43G. The support member 44 is supported by the base frame 43 via the elastic members (insulators) 441 provided on tabs 43T formed at the left and right corner portions of the front side of the base frame 43 and at roughly the middle of the rear portion of the base frame 43. Namely, the support member 44 is supported by the base frame 43 via the elastic members 441 provided at three points which roughly form an isosceles triangle.

As shown in FIG. 6, each elastic member 441, which is formed from an elastic material such as rubber or the like, has a roughly cylindrical shape and includes a center hole 441a and a groove 441b formed in the outer circumferential surface in the circumferential direction thereof. Further, when the elastic members 441 are arranged in place to support the support member 44 on the base frame 43, the center hole 441a of each elastic member 441 fits onto an axis provided on the respective tabs 43T of the base frame 43 and then the groove 441b fits over a respective notched portion formed at the corresponding position of the support member 44.

Further, as shown in FIGS. 3 and 4, the support member 44 is provided with a spindle motor (not shown in the drawings) for rotating an optical disc 3, a turntable 46 fixed to a rotation axis 45 of the spindle motor, and optical head (optical pick-up) 47 (which includes an actuator), and an optical head moving mechanism 48 for moving the optical head 47 in the radial direction of the optical disc 3. The spindle motor is capable of rotating the optical disc 3 at a high rotational speed, for example, at a speed capable of rotating the optical disc 3 at 200–6400 rpm.

The turntable 46 is a disc-shaped member which includes a protruding ring-shaped center hub 46a formed in the center portion of the turntable 46. This center hub 46a is adapted to fit into a center hole 3a of the optical disc 3. Further, the center hub 46a is formed so as to taper from the tip to the base in order to prevent the optical disc 3 from slipping off center when placed on the turntable 46. Further, a ring-shaped permanent magnet 46b for creating an attraction force on a disc clamp (described below) is provided in the center hub 46a in the circumferential direction of the rotation axis 45 of the spindle motor.

Further, a ring-shaped pad 46c is bonded to the upper part of the turntable 46 (i.e., the side used to support the optical disc 3) around the circumference of the center hub 46a. The pad 46c is made from an elastic material, such as various rubbers, soft resins or porous materials (sponges), which is constructed so as to have a relatively high coefficient of friction in order to prevent the optical disc 3 from slipping.

The optical head 47 is a flat type optical head (pickup) constructed so as to deflect light reflected from the optical disc 3 by roughly 90 degrees using a mirror (or prism) or the like to guide such light toward a light gathering element such as a photodiode or the like.

As shown in FIGS. 3 and 4, the optical head moving mechanism 48 is constructed from a motor 48a capable of forward/reverse rotation, a worm gear 48b which is rotated by the motor 48a, a worm wheel 48c which meshes with the worm gear 48b, a rack gear 48d which meshes with the worm wheel 48c, a slider 48e which is fixed to the rack gear 48d, a guide rod 48g which regulates the direction of movement of the slider 48e, and a head support (pick-up base) 48f which is integrally formed with the slider 48e, with the head support 48f being provided with the optical head 47. Further, the worm gear 48b and the guide rod 48g are arranged so that their lengthwise directions are directed roughly parallel to the forward and backward direction of the disc drive 1A.

In this type of optical head moving mechanism 48, if the worm gear 48b is rotated in a prescribed direction by the motor 48a, this rotation is transmitted through the worm wheel and the rack gear to the slider 48e, and this force causes the slider 48e to move along the guide rod 48g in the forward-backward direction of the disc drive 1A, whereby the optical head 47 fixed to the head support 48f is moved in the radial direction of the optical disc 3 loaded on the disc tray 5. In this construction, the optical head 47 and the optical head moving mechanism 48 form a playback or playback and recording means.

Further, the operations of the spindle motor, motor 48 and motor (described below) are controlled by a control means (CPU) provided in the circuit substrate assembly (not shown in the drawings).

As shown in FIGS. 3 and 4, a cam mechanism 50 which can be moved between a first position (FIG. 3) and a second position (FIG. 3) is provided in front of the mechanism unit 42, and this cam mechanism is operatively coupled with the mechanism unit 42 to displace the mechanism unit 42 between a lowered position (FIG. 3) and a raised position (FIG. 4). Namely, the cam mechanism 50 can be operated to move the mechanism unit 42 to either the lowered position when the cam mechanism is in the first position shown in FIG. 3, or the raised position when the cam mechanism is in the second position shown in FIG. 4.

Figure 8:
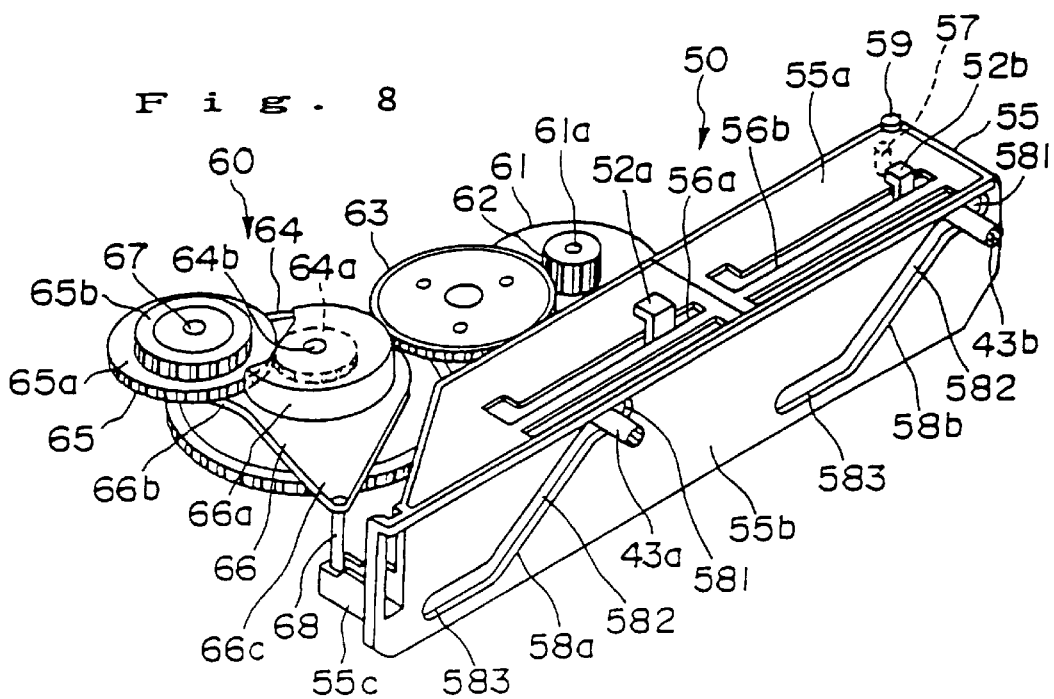
FIG. 8 is a perspective view showing the structure of the cam member used in the disc drive shown in FIG. 2, in which the cam member is shown in a second position.

In more details, as shown in FIGS. 7 and 8, the cam mechanism 50 includes a cam member 55 arranged so as to be slidable between a first position (FIG. 7) and a second position (FIG. 8) in the sideways direction with respect to the chassis 40 (i.e., the horizontal direction orthogonal to the direction of movement of the disc tray 5). The cam member 55 is constructed from a roughly plate-shaped horizontal portion 55a and a plate-shaped vertical portion 55b which is integrally formed with one lengthwise edge of the horizontal portion 55a so as to make a structure having a roughly L-shaped cross section.

Formed on the horizontal portion 55a of the cam member 55 are sideways guide grooves 56a, 56b which engage respectively with a pair of protrusions 52a, 52b which protrude from the top of the front portion of the chassis 40. Further, the underside surface of the horizontal portion 55a is provided with an engaging pin 57 which is inserted into an elongated slot formed in the top of the front portion of the chassis 40. This engaging pin 57 is adapted to engage with an emergency eject mechanism (described below).

Further, the vertical portion 55b of the cam member 55 is positioned to face the front wall which defines the opening 41 of the chassis 40. Formed in the vertical portion 55b are a pair of cam grooves 58a, 58b each having the same shape. Each of the cam grooves 58a, 58b is constructed from a horizontally extending upper groove 581 and lower groove 583 and a slanting groove 582 which connects the upper groove 581 and lower groove 583.

Further, the guide pins (following members) 43a, 43b adapted for insertion into the cam grooves 58a, 58b, respectively, are provided on the front surface of the base frame 43 of the mechanism unit 42 as described above. In this way, when the cam member 55 is moved between the first position and the second position, the guide pins 43a, 43b are moved by the slide abutment with the cam grooves 58a, 58b in the up and down direction.

Namely, when the cam member 55 is positioned at the first position, the guide pins 43a, 43b are engaged with the lower grooves 583 (FIG. 7), and the front portion of the mechanism unit 42 is in the lowered position shown in FIG. 3. When the cam member 55 is moved from the first position to the second position, the guide pins 43a, 43b move up by the slanting grooves 582, thereby causing the front portion of the mechanism unit 42 to move from the lowered position toward the raised position. Then, when the cam member 55 reaches the second position, the guide pins 43a, 43b engage with the upper grooves 581 (FIG. 8), and the front portion of the mechanism unit 42 is displaced to the raised position shown in FIG. 4.

Further, a protrusion 59 is integrally formed on an end portion of the horizontal member 55a of the cam member 55 to engage with the cam member movement restricting groove 7 formed in the underside surface of the disc tray 5. As a result, the protrusion 59 is engaged with the first movement restricting groove 7a of the disc tray 5 and is thereby prevented from moving in the sideways direction, whereby the cam member is held at the first position. Then, in accordance with the movement of the disc tray 5, the protrusion 59 slides from the first movement restricting groove 7a to the second movement restricting groove 7b, and upon moving through this slanting groove, the cam member 55 is displaced within the range of the lower grooves 583 of the cam grooves 58a, 58b of the cam member 55. Then, when the protrusion 59 reaches the position of the third movement restricting groove 7c, the cam member 55 moves toward the second position.

Further, the cam mechanism 50 and a drive mechanism 60 for moving the disc tray 5 are provided in the front portion of the mechanism unit 42 of the chassis 40.

As shown in FIGS. 7 and 8, the drive mechanism 60 includes a loading motor 61 capable or forward/reverse rotation provided in the underside surface of the front portion of the chassis 40, a pinion gear 62 mounted on a rotation axis 61a of the motor 61, a medium-diameter second gear 63 which meshes with the pinion gear 62, and a large-diameter third gear 64 which meshes with a small gear (not shown in the drawings) fixed coaxially below the second gear 63. Further, a small-diameter cylindrical portion is integrally formed on top of the third gear 64 so as to be coaxial therewith, with a small gear 64a being integrally formed on top of this cylindrical portion so as to be coaxially therewith.

Meshing with the small gear 64a of the third gear 64 is an operative gear 65 which meshes with the first and second racks 6a, 6b of the disc tray 5. Namely, the operative gear 65 includes a lower gear 65a which meshes with the small gear 64a of the third gear 64, and an upper gear 65b which meshes with the rack 6 of the disc tray 5, in which the upper gear 65b being integrally formed on the same axis as the lower gear 65a.

In the present embodiment, the gears 62–65 are flat teeth gears, which constitute a rotational speed reduction mechanism for the motor 61.

The operative gear 65 is provided so as to be capable of rotation on a rotation axis 67 provided on a planetary arm 66 mounted to a rotation axis 64b of the third gear 64. The planetary arm 66 includes a rotation portion 66a which is rotatably fitted onto the cylindrical portion of the third gear 64, and first and second arms 66b, 66c which extend from the rotation portion 66a, so that the whole of the planetary arm 66 has a roughly v-shaped structure.

One end of the first arm 66b of the planetary arm 66 is provided with the protruding rotation axis 67 to which the operative gear 65 is rotatably mounted. Namely, the operative gear 65 rotates about the axis 67 of the first arm 66b which functions as a rotation axis thereof as well as the operative gear 65 also turns around the axis 64b which functions as a revolution axis, so that the operative gear 65 functions as a planetary gear which can be turned around the axis 64b along the second rack 6b with being rotated about the axis 67. In this planetary gear mechanism, the operative gear 65 acts as a planet gear and the small gear 64a of the third gear 64 acts as a sun gear. Further, the end of the second arm 66c of the planetary arm 66 is provided with a pin 68 which protrudes downward into an engaging portion formed in the cam member 55.

In this connection, as shown in FIGS. 7 and 8, one part of the rotation portion 66a of the planetary arm 66 is partially cut away to expose the small gear 64a of the third gear 64 in order to enable the lower gear 65a of the operative gear 65 to mesh with the small gear 64a of the third gear 64.

In this structure, the operative gear 65 carries out a first operation when engaged with the first rack 6a of the disc tray 5, in which the disc tray 5 is moved between the disc ejected position and the disc loaded position with the cam mechanism 50 being held at a prescribed position, and a second operation when engaged with the second rack 6b of the disc tray 5, in which the cam mechanism is moved between the first position and the second position.

Namely, while the protrusion 59 provided on the top of the horizontal portion 55a of the cam member 55 is in engagement with the first movement restricting groove 7a in the underside surface of the disc tray 5, the movement of the cam member 55 from the first position to the second position is restricted. Accordingly, during such time, in other words during the time that the disc tray 5 is moving between the ejected position and the loaded position, the pin 68 of the second arm 66c of the planetary arm 66 is engaged with the engagement portion 55c of the cam member 55, thereby making it impossible for the planetary arm 66 to be turned around the axis 64b. As a result, the operative gear 65 is held at a prescribed position while the protrusion 59 of the cam member 55 is engaged with the first movement restricting groove 7a of the disc tray 5. In this state, as shown by the dashed line in FIG. 3, the operative gear 65 engages with the first linear rack 6a of the disc tray 5, whereby the disc tray 5 is moved from the disc ejected position to the disc loaded position by means of the rotation of the operative gear according to the rotation of the motor 61, and in this way the operative gear 65 functions as a driving gear for moving the disc tray 5.

On the other hand, when the disc tray 5 moves accordingly to a position just before the disc loaded position, the protrusion 59 of the cam member 55 moves from the first movement restricting groove 7a to the second movement restricting groove 7b of the disc tray 5, and this causes the cam member 55 to be displaced by a small amount. Then, the disc tray 5 moves further, and when abutting portions 5d, 5e of the disc tray 5 come into abutment with wall portions 40b of the chassis 40 and thereby further movement of the disc tray 5 is restricted, the protrusion 59 reaches the third movement restricting groove 7c, whereby the cam member 55 is able to move from the first position to the second position. In this state, as shown by the dashed line in FIG. 4, since the operative gear 65 engages with the arc-shaped second rack 6b and the cam member 55 is able to move to the second position and therefore the planetary arm 66 can be turned around the axis 64b, the operative gear 65 moves along the arc-shaped second rack 6b in accordance with the rotation of the motor 61.

In accordance with such a turning movement of the operative gear 65, the planetary arm 66 rotates clockwise around the common axis 64b from the position shown in FIG. 7 to the position shown in FIG. 8, which in turn causes the second arm 66c of the planetary arm 66 to rotate in the same direction. In accordance with this rotation of the second arm 66c, the cam member 55 is driven by means of the pin 68 coupled with the engaging portion 55c and moves from the first position shown in FIG. 7 toward the second position shown in FIG. 8. In accordance with this movement of the cam member 55 from the first position toward the second position, the front guide pins 43a, 43b of the base frame 43 of the mechanism unit 42 rise up along the slanting grooves 582, 582, whereby the front portion of the mechanism unit 42 is displaced from the lowered position shown in FIG. 3 to the raised position shown in FIG. 4.

Figure 9:
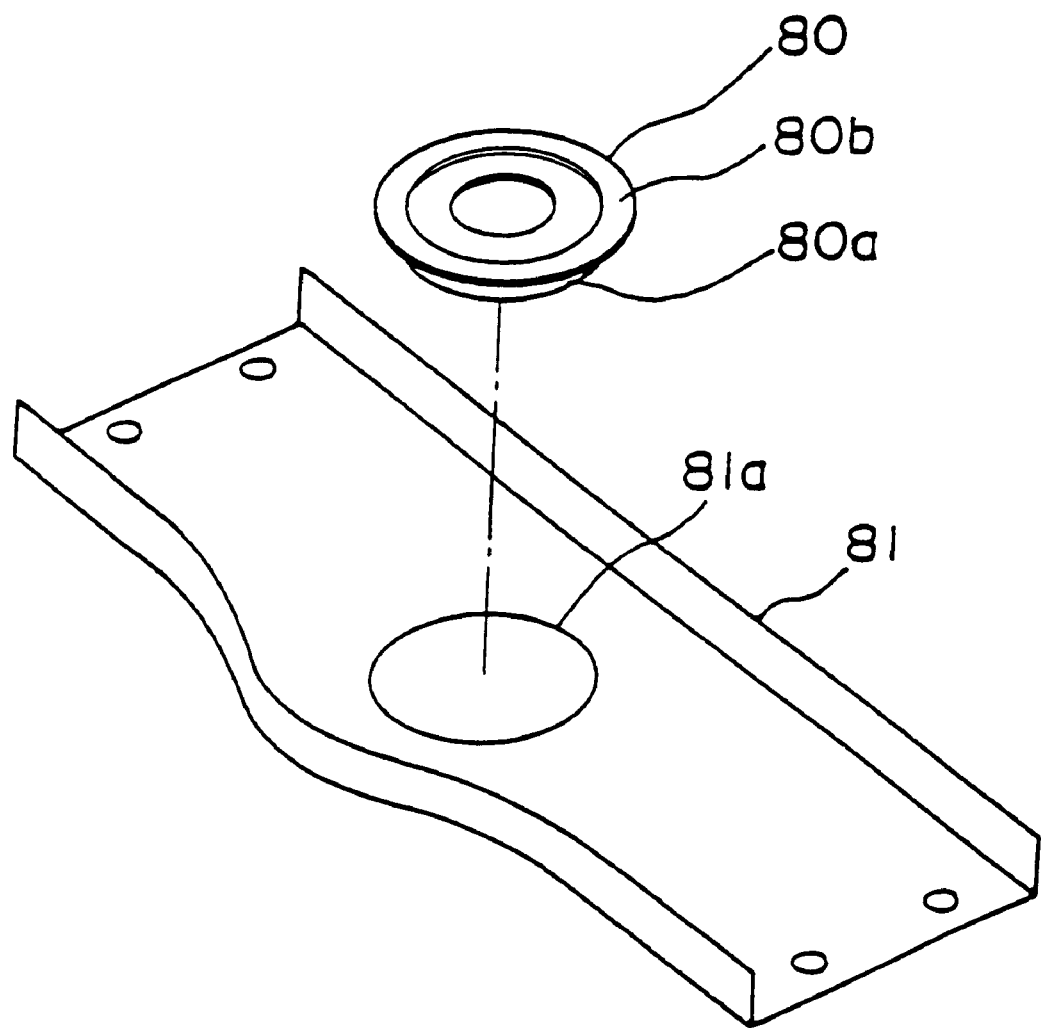
FIG. 9 is a perspective view showing the structure of a disc clamp used in the disc drive shown in FIG. 2.

Further, a disc clamp 80 is provided on the upper portion of the chassis 40, and as shown in FIG. 9, the disc clamp 80 is supported for rotation by a plate-shaped support member 81 having a central opening 81a.

In particular, the support member 81 is fastened at both ends with bosses (or rivets) to mounting portions 40c of the chassis 40 so as to secure the support member 81 to the chassis 40 in the side-ways direction. On the other hand, the disc clamp 80 is formed from a flat drum-shaped main body 80*a* having a bottom portion that is inserted into the opening 81*a* of the support member 81, and a flange portion 80*b* which is formed around the upper circumferential portion of the main body 80*a*. The flange portion 80*b* is adapted to abut the top of the support member 81. Further, an annular steel attraction member is provided inside the main body 80*a* and is adapted to be pulled by the permanent magnet provided in the turntable 46.

Further, the disc drive 1A according to the present invention is equipped with an emergency eject mechanism 70 which enables the disc tray 5 to be manually moved forward to eject the optical disc 3 when the optical disc 3 stops rotating due to a power outage, for example, when the optical disc 3 is being rotated for playback.

As shown in FIGS. 3 and 4, the emergency eject mechanism 70 is arranged in the front portion of the chassis 40 and is constructed from a lever 71 which is provided in a rotatable manner on the side of the drive mechanism 60. The lever 71 is a roughly L-shaped member which includes a central portion 71*a* fixed to a rotation axis 72, a cam member drive portion 71*b* which extends from the central portion 71*a*, and a push portion 71*c* which also extends from the central portion 71*a* so as to be roughly perpendicular to the extending direction of the drive portion 71*b*. The front end of the cam member drive portion 71*b* meshes with an engagement pin 57 formed on the underside surface of the horizontal portion 55*a* of the cam member 55, and the tip of the push portion 71*c* is provided with a jig receiving portion for receiving a jig (not shown in the drawings) which is to be inserted through an aperture formed in the front panel 13.

With the emergency eject mechanism 70 constructed in this way, if the cam member 55 is moved from the first position shown in FIG. 7 (FIG. 3) to the second position shown in FIG. 8 (FIG. 4), the engagement pin 57 formed on the underside of the horizontal portion 55*a* of the cam member 55 pushes the cam member drive portion 71*b*, thereby rotating the lever 71 to the position shown in FIG. 4.

Now, in the case where a power outage occurs in this condition, the motor 61 of the drive mechanism stops operating, and this causes the mechanism unit 42 to stay at the raised position, thereby making it impossible to electronically eject the optical disc 3.

In such case, a slender rod-shaped jig is inserted through the aperture formed in the front panel 13 of the disc drive 1A, with the tip of the jig coming into contact with the jig receiving portion 71*c* of the lever 71, and then in this state the jig is manually pushed further inward. When this is done, the lever 71 rotates in the counterclockwise direction about the rotation axis 72 from the position shown in FIG. 4, and in accordance with such rotation, the cam member drive portion 71*b* pushes the engagement pin 57 of the cam member 55 in the sideways direction, and as a result, the cam member 55 is moved from the second position (FIG. 8) to the first position (FIG. 7). Accordingly, the mechanism unit 42 also moves from the raised position (FIG. 4) to the lowered position (FIG. 3), thereby removing the optical disc 3 from the turntable 46 and causing the disc tray 5 to slightly protrude out of the aperture 13*a* of the front panel 13. In this state, the operative gear 65 of the drive mechanism 60 engages with the first rack 6*a* of the disc tray 5, thereby making it possible to grasp the protruding portion and manually pull the disc tray 5 out through the aperture 13*a* of the front panel 13.

Next, a description of the operation of the disc drive 1A will be given.

When the disc drive 1A is not is use, the empty disc tray 5 is housed inside the casing 10 (inside the main body 2) at the disc loaded position. In this state, as shown in FIG. 4, the mechanism unit 42 is in the raised position, the cam member 55 is in the second position, and the protrusion 59 of the horizontal portion 55*a* of the cam member 55 is in the third movement restriction groove 7*c*. Further, as shown by the dashed lines in FIG. 4, the operative gear 65 of the drive mechanism 60 meshes an end portion of the second rack 6*b* of the underside surface of the disc tray 5 which is far away from the first rack 6*a* thereof.

Now, if an eject operation is carried out, the motor 61 will rotate in a prescribed direction, whereby the operative gear 65 is caused to rotate, by means of a rotational speed reduction mechanism. In this state, the operative gear 65 functions as a planetary gear which can be turned around the revolution axis 64*b*, and in accordance with this revolution, the operative gear 65 moves along the second rack 6*b* toward the first rack 6*a*. In accordance with the revolution of the operative gear 65, the planetary arm 66 rotates in the counterclockwise direction about the common axis 64*b*. In accordance with the rotation of the planetary arm 66, the second arm 66*c* causes the cam member 55 to move, via the pin 68, from the second position shown in FIG. 4 (FIG. 8) to the first position shown in FIG. 3 (FIG. 7), whereby the mechanism unit 42 is also moved from the raised position to the lowered position. In this case, while the cam member 55 is moving from the second position to the first position, the protrusion 59 on top of the horizontal portion 55*a* of the cam member 55 slides along the third movement restricting groove 7*c*, and reaches the first movement restricting groove 7*a* via the second movement restricting groove 7*b*.

At that point, the operative gear 65 moves from the arc-shaped second rack 6*b* to the linear first rack 6*a*, and the protrusion 59 of the cam member 55 also moves from the second movement restricting groove 7*b* to the first movement restricting groove 7*a*. When the protrusion 59 of the cam member 55 is moved to the first movement restriction groove 7*a*, the cam member 55 is restricted from moving in the sideways direction, so that the rotation of the planetary arm 66 is also restricted. In this state, the operative gear 65 acts as a driving gear to drive the disc tray 5 at that position. As a result, as shown by the dashed line in FIG. 3, the operative gear 65 engages with the first rack 6*a* of the disc tray 5, whereby the disc tray 5 is moved from the loaded position to the eject position according to the rotation of the motor 61. In this state, the mechanism unit 42 is displaced to the lowered position at a prescribed spacing from the disc clamp 80. Accordingly, the disc clamp 80 and the turntable 46 do not hinder the eject operation of the disc tray 5.

Now, if a loading operation is carried out by placing the optical disc 3 into the disc supporting portion 5*a* of the disc tray 5 which is ejected to the outside through the aperture 13*a* of the front panel 13, the motor 61 will rotate in the opposite direction (i.e., the direction opposite that described above), thereby causing the operative gear 65 to rotate, via the rotational speed reduction mechanism, in the counterclockwise direction (i.e., reverse direction) shown in FIG. 3. Accordingly, the disc tray 5 moves backward (toward the rear of the disc drive) through the aperture 13*a* to the disc loaded position. In this way, the optical disc 3, which is supported at a prescribed position on top of the disc tray 5, will also be transported to the disc loaded position inside the main body 2.

During the loading of the disc tray 5, namely while the disc tray 5 is moving backward, the operative gear 65 engages with the first rack 6a on the underside surface of the disc tray 5, and the protrusion 59 of the cam member 55 is guided along the first movement restriction groove 7a. Accordingly, the cam member 55 is held at the first position, and is therefore unable to move to the second position. Consequently, the planetary arm 66 is held at a prescribed position so as to be unable to rotate. In this case, the operative gear 65 rotates at such a position, so that it functions as a driving gear for driving the disc tray 5. Further, in this state, the front portion of the mechanism unit 42 is held at the lower position.

When the disc tray 5 approaches the disc loaded position, the protrusion 59 formed on the cam member 55 moves from the first movement restriction groove 7a to the second movement restriction groove 7b, thereby causing the cam member 55 to move slightly in the sideways direction. Then, when the disc tray 5 reaches the disc loaded position, abutment portions 5d, 5e provided on the rear portion of the disc tray 5 abut the wall portion 40b of the chassis 40, thereby restricting any further movement of the disc tray 5. In this state, the protrusion 59 of the cam member 55 moves to the third movement restriction groove 7b via the second movement restriction groove 7b, thereby enabling the cam member 55 to move from the first position to the second position, which in turn also makes it possible for the planetary arm 66 to rotate. In this state, the operative gear 65 moves from the first rack 6a to the second rack 6b.

As a result, in this state, because the movement of the disc tray 5 is restricted while the planetary arm 66 is capable of revolution, if the operative gear 65 is rotated by the motor 61, the operative gear 65 moves and turns along the arc-shaped second rack 6b around the axis 64b. Therefore, in this state, the operative gear 65 functions as a planetary gear.

When the operative gear 65 functions as a planetary gear and moves along the arc-shaped second rack 6b as described above, the planetary arm 66 also rotates in accordance with the movement of the operative gear 65, around the common axis 64b in the clockwise direction shown in FIG. 3. When the planetary arm 65 rotates in this way, the second arm 66c of the planetary arm 66 also rotates in the same manner in the clockwise direction, thereby causing the cam member 55 to move from the first position to the second position.

In accordance with the movement of the cam member 55, the guide pins 43a, 43b of the front end of the base frame 43 of the mechanism unit 42 slide along the slanting grooves 582 of the cam grooves 58a, 58b and move upward to the upper grooves 581. Accordingly, the mechanism unit 42 is displaced from the lowered position to the raised position, whereby the central hole 3a of the optical disc loaded on the disc tray 5 engages with the center hub 46a of the turntable 46. Then, by means of the pulling force which acts on the disc clamp 80 by means of the permanent magnet of the turntable 46, the optical disc 3 is sandwiched between the turntable 46 and the disc clamp 80.

In this state, if an operation such as a playback operation is carried out, the spindle motor is operated to rotate the turntable 46 in prescribed speeds, thereby making it possible to playback the optical disc 3. In this case, if the optical disc 3 is rotated at a high rate of speed (such as 8-times speed or 12-times speed), the optical disc 3 may undergo eccentric rotation due to eccentricity of the optical disc or dimensional error, and as explained previously above, this leads to the generation of vibrations.

However, in this embodiment, the turntable 46 is provided on the support member 44 which is supported by the base frame 43 of the mechanism unit 42 via the elastic members 441. Further, the support member 44 is supported at three locations, namely at a central portion and both front corner portions. In other words, the arrangement of the elastic members forms a rough isosceles triangle, with the turntable positioned inside such triangular arrangement.

As a result, if vibrations due to eccentric rotation of the optical disc 3 occur in the horizontal direction, the support member 44 will be displaced in the horizontal direction about the elastic member 441 at the rear central portion of the support member 44, whereby the elastic members 441 provided at the front corner positions of the support member 44 are able to absorb such displacement. Accordingly, by supporting the support member 44 on which the turn table 46 is provided at the three points described above, the disc drive 1A becomes highly effective at absorbing vibrations due to high speed rotation of the optical disc 3, and this is accomplished without having to provided a separate special vibration dampening means. As a result, the disc drive 1A is highly effective at preventing the transmission of vibrations generated due to high speed rotation of the optical disc 3 from reaching the base frame 43, the chassis 40, the casing 10 and the like.

In particular, in embodiment described above, the drive mechanism 60 of the disc tray 5 and the cam mechanism 50 are all housed inside the space in the front of the mechanism unit 42 inside the chassis 40. Consequently, a sufficient amount of space is created on the left and right sides of the mechanism unit 42, and this makes it possible for the base frame 43 of the mechanism unit 42 and the support member 44 to be formed with sufficient widths. Consequently, out of the various possible arrangements, the particular arrangement of elastic members 441 placed at side positions of the turntable 46 make it possible to provide sufficient spacing between the elastic members 441, and in this respect it becomes possible to arrange the elastic members 441 at left and right side positions at the front of the turntable 46. Furthermore, such arrangement of elastic members 441 is particularly effective at preventing the transmission of vibrations due to rotation of the optical disc 3.

Now, when playback is finished or when playback is stopped in order to switch to another disc, the eject button is pushed after operation of the playback switch (i.e., an operation to stop playback). When this is done, the operation described above for ejecting the disc tray 5 is carried out to eject the disc tray 5 on which the optical disc 3 is placed, to the outside of the main body 2.

In the case where the motor 61 stops operating, such as during a power outage, the optical disc 3 is stuck in the loaded position. In such a case, a jig may be inserted through the insertion aperture of the front panel 13 of the disc drive 1A to push the push portion 71c of the lever 71 in order to rotate the lever 71. When this is done, the lever 71 rotates in the counterclockwise direction shown in FIG. 4, and in accordance with such rotation, the cam member drive member 71b is rotated in the same direction, whereby the cam member 55 is forcedly moved from the second position shown in FIG. 8 to the first position shown in FIG. 7, which at the same time causes the mechanism unit 42 to move from the raised position to the lowered position.

As a result, the optical disc 3 is released from the clamped condition between the disc clamp 80 and the turntable 46 and returns to the disc supporting portion of the disc tray 5. In this state, the operative gear 65 also moves from the second rack 6b to the first rack 6a, and the protrusion 59 of the edge portion of the horizontal portion 55a of the cam member 55 moves from the third movement restriction groove 7c to the first movement restriction groove 7a via the second movement restriction groove 7b.

Consequently, the disc tray 5 is forced to protrude out slightly from the aperture 13a of the front panel 13 of the disc drive 1A, whereby it becomes possible to grasp and manually pull the disc tray 5 outward to the eject position. Accordingly, in the above embodiment it is possible to easily eject the optical disc 3 even in the case where there is no electrical power during playback.

In the above embodiment, when the mechanism unit 42 is raised and lowered (i.e., displaced between a raised position and a lowered position), the operative gear 65 engages with the second rack 6b so as to function as a planetary gear. In this respect, the arrangement for raising and lowering of the mechanism unit 42 in the disc drive 1A according to the present invention is not limited to the construction describe above. In the present invention, means for displacing the mechanism unit 42 from the lowered position to the raised position is particularly significant. Therefore, other mechanism can be also adopted for lowering the raised mechanism unit 42. For example, in the case where the operative gear 65 engages with the second rack 6b, it is possible to release such engagement for displacing the mechanism unit 42 at the raised position to the lowered position.

As stated in the above, according to the disc drive of the present invention, the operative gear 65 of the drive mechanism 60 acts not only as a driving gear for driving the disc tray 5 but also as a driving gear for driving the cam member 55 which displaces the mechanism unit 42 between the raised position and the lowered position, and such an operative gear 65 having the functions is accommodated within a limited space in the chassis 40 provided in front of the mechanism unit 42. Therefore, it is possible to simplify the structure of the disc drive in comparison with the prior art disc drive. Further, by employing such a part as the planetary arm 66 which supports the operative gear 65 rotatably and acts to move the cam member 55, the number of the parts required can be reduced and the assembly thereof can be made easy.

Further, in the disc drive according to the present invention, the mechanism unit is constructed from the base frame and the support member on which the turntable or the like are provided, and the support member is supported on the base frame by means of three elastic members which are arranged at the left and right sides of the turntable and at the back side of the turntable. BY such an arrangement of the elastic members, it is possible to effectively absorb vibrations generated by eccentric rotation of the optical disc, thereby enabling to prevent such vibrations from being transmitted to the base frame or the chassis. In particular, since the drive mechanism (loading mechanism) is accommodated in a limited space of the chassis in front of the mechanism unit, it is possible for the mechanism unit to have a sufficient width. As a result, it is possible to arrange the elastic members at the corners position of the base frame so as to have a sufficient distance therebetween at the right and left sides of the front of the turntable, and such an arrangement of the elastic members are particularly effective for absorbing the vibrations.

Finally, it is to be understood that many changes and additions may be made to the embodiments described above without departing from the scope and spirit of the invention as defined in the appended claims.

What is claimed is:

1. A disc drive comprising:
   a main body having a chassis;
   a mechanism unit having a turntable on which a disc is to be placed and a pick-up for playing back or playing back and recording the disc, said mechanism unit having a front portion and a rear portion wherein said rear portion of said mechanism unit is pivotally supported on said chassis such that said front portion is displaceable between a raised position in which the disc is supported on the turntable and a lowered position which is lower than the raised portion;
   a cam mechanism provided so as to be cooperatively associated with said mechanism unit, said cam mechanism adapted to be displaceable between a first position in which the mechanism unit is in the lowered position and a second position in which the mechanism unit is in the raised position wherein said cam mechanism is provided adjacent to the front portion of said mechanism unit through a predetermined space therebetween so as to be displaceable in a substantially horizontal direction orthogonal to the moving direction of said disc tray between said first and second positions and wherein said cam mechanism includes a plate-shaped member having at least one slanting cam which guides a cam pin provided on the front portion of said mechanism unit in an up and down direction in accordance with the displacement of the cam mechanism;
   a disc tray which is movable with respect to the main body between a disc loading position and a disc eject position, said disc tray having a first rack and a second rack which is continuous to the first rack; and
   a drive mechanism having an operative gear which is engaged with the racks of the disc tray, said drive mechanism carries out a first operation which moves said disc tray between the disc loading position and the disc eject position with said cam mechanism being held at said first position, when said operative gear is engaged with the first rack, and a second operation which displaces said cam mechanism between said first position and said second position when said operative gear is engaged with said second rack.

2. The disc drive as claimed in claim 1 wherein said second operation is carried out when said disc tray is moved to the disc loading position and further movement thereof is restricted.

3. The disc drive as claimed in claim 1 wherein said first rack is formed into a linear shape which extends along the direction of the movement of said disc tray, and said second rack is formed into an arc-shape continuous to said first linear rack, said operative gear being held at a prescribed position during the first operation and acting as a driving gear which is in engagement with the first rack for moving said disc tray and, during the second operation, acting as a planetary gear which is in engagement with the second rack for displacing said cam mechanism between said first and second positions.

4. The disc drive as claimed in claim 1 wherein said drive mechanism includes a motor and a rotational speed reduction mechanism comprising a plurality of gears for transmitting the rotation of the motor with reducing its speed, and said plurality of gears includes a gear which acts as a sun gear having a rotation axis, a planetary arm which is rotatably supported on the rotation axis of the sun gear wherein said operative gear is in mesh with said sun gear and rotatably supported by said planetary arm.

5. The disc drive as claimed in claim 1 wherein said planetary arm has a central portion which is mounted to the rotation axis of the sun gear of the rotational speed reduction mechanism, a first arm extending from the central portion and a second arm extending from the central portion in which said first arm is provided with a rotation axis for said operative gear and said second arm is coupled with said cam mechanism.

6. The disc drive as claimed in claim 1 wherein said plate-shaped member is arranged adjacent to the front portion of said mechanism unit, and said plate-shaped member has first and second slanting cams arranged spaced apart in the horizontal direction for guiding first and second cam pins provided on the front portion of said mechanism unit in an up and down direction in accordance with the displacement of the cam mechanism.

7. The disc drive as claimed in claim 1 wherein said cam mechanism is being held at said first position while said disc tray is moving from the disc eject position to the disc loading position.

8. A disc drive comprising:

a main body having a chassis;

a mechanism unit having a turntable on which a disc is to be placed and a pick-up for playing back or playing back and recording the disc, said mechanism unit having a front portion and a rear portion wherein said rear portion of said mechanism is pivotally supported on said chassis such that said front portion is displaceable between a raised position in which the disc is supported on the turntable and a lowered position which is lower than the raised position;

a cam mechanism provided so as to be cooperatively associated with said mechanism unit, said cam mechanism adapted to be displaceable between a first position in which the mechanism unit is in the lowered position and a second position in which the mechanism unit is in the raised position, wherein said cam mechanism is provided adjacent to the front portion of said mechanism unit through a predetermined space therebetween so as to be displaceable in a substantially horizontal direction orthogonal to the moving direction of said disc tray between said first and second positions, and wherein said cam mechanism includes a plate-shaped member having at least one slanting cam which guides a cam pin provided on the front portion of said mechanism unit in an up and down direction in accordance with the displacement of the cam mechanism;

a disc tray which is movable with respect to the main body between a disc loading position and a disc eject position, said disc tray having a rack; and a drive mechanism having an operative gear which is in engagement with the rack of said disc tray for moving said disc tray between the disc loading position and the disc eject position wherein said drive mechanism displaces said cam mechanism from said first position to said second position by means of said operative gear when said disc tray is moved to the disc loading position by said drive mechanism.

9. The disc drive as claimed in claim 8 wherein said plate-shaped member is arranged adjacent to the front portion of said mechanism and said plate-shaped member has a first and second slanting cams arranged spaced apart in the horizontal direction for guiding first and second cam pins provided on the front portion of said mechanism unit in up and down direction in accordance with the displacement of the cam mechanism.

* * * * *

UNITED STATES PATENT AND TRADEMARK OFFICE
CERTIFICATE OF CORRECTION

PATENT NO. : 5,995,468

Page 1 of 2

DATED : November 30, 1999

INVENTOR(S) : Furukawa

It is certified that error appears in the above-identified patent and that said Letters Patent is hereby corrected as shown below:

**On the Title Page; Attorney, Agent, or Firm: Brian M. Mattson;
Patents + TMS, P.C.
On the Title Page, Item [57] Abstract, line 14, replace "from" with ---- from ----**

```
col.  3 line 38: omit "a" before the word "another"
col.  3 line 59: omit "and" before the word "and"
col.  4 line 59: add "the" before the word "up"
col.  5 line 14: omit "and" before the word "and"
col.  5 line 60: replace "BY" with "By"
col.  6 line 49: add "to" before the words "the present"
col.  7 line 16: replace "an" with "a"
col.  8 line 35: add "." after the number "41"
col.  9 line 64: replace "(FIG.3)" with "(FIG.4)"
col. 11 line 10: replace "or" with "of"
col  12 line 30: omit "the" before the word "the"
col. 14 line  3: replace "is" with "in"
```

UNITED STATES PATENT AND TRADEMARK OFFICE
CERTIFICATE OF CORRECTION

PATENT NO. : 5,995,468

DATED : November 30, 1999

INVENTOR(S) : Furukawa

It is certified that error appears in the above-identified patent and that said Letters Patent is hereby corrected as shown below:

```
col. 15 line 58: replace "in" with "at"
col. 16 line 17: replace "provided" with "provide"
col. 17 line 16: replace "describe" with "described"
col. 17 line 20: replace "mechanism" with "mechanisms"
col. 17 line 47: replace "BY" with "By"
```

Signed and Sealed this

Twenty-ninth Day of May, 2001

Attest:

Attesting Officer

NICHOLAS P. GODICI

Acting Director of the United States Patent and Trademark Office